United States Patent [19]

Mayska et al.

[11] Patent Number: 4,775,738

[45] Date of Patent: Oct. 4, 1988

[54] PROCESS FOR THE PREPARATION OF POLYETHER-SULPHONES

[75] Inventors: Paul J. Mayska; Erhard Tresper, both of Krefeld, Fed. Rep. of Germany

[73] Assignee: Bayer Aktiengesellschaft, Leverkusen, Fed. Rep. of Germany

[21] Appl. No.: 900,964

[22] Filed: Aug. 27, 1986

[30] Foreign Application Priority Data

Sep. 3, 1985 [DE] Fed. Rep. of Germany ....... 3531361

[51] Int. Cl.$^4$ ............................................. C08G 63/62
[52] U.S. Cl. .................... 528/173; 528/171; 528/174; 528/196; 528/204; 528/219
[58] Field of Search .............. 528/173, 171, 174, 196, 528/204, 219

[56] References Cited

U.S. PATENT DOCUMENTS 3,271,367 9/1966 Schnell et al. ...................... 361/408
4,404,351 9/1983 Käfer et al. ......................... 528/171

FOREIGN PATENT DOCUMENTS 1570617 2/1970 Fed. Rep. of Germany.
808489 2/1959 United Kingdom.

OTHER PUBLICATIONS

Kunststoffe 69, 1979, pp. 3–5.
Encyclopedia of Chemical Technology, Third Edition, vol. 18, pp. 832–848.
Kirk-Othmer, Kunststoffe 69, 1979, pp. 605–610.

*Primary Examiner*—John Kight
*Assistant Examiner*—M. L. Moore
*Attorney, Agent, or Firm*—Gene Harsh; Joseph C. Gil; Aron Preis

[57] ABSTRACT

The present invention relates to the preparation of polyether-sulphones from polycarbonates.

10 Claims, No Drawings

PROCESS FOR THE PREPARATION OF POLYETHER-SULPHONES

The present invention relates to the preparation of polyether-sulphones of the formula (I)

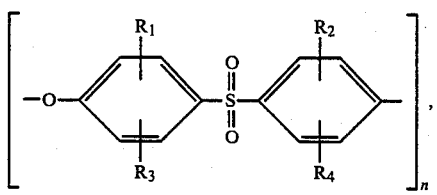

wherein
n is an integer from 5 to 200, and wherein
$R_1$, $R_2$, $R_3$ and $R_4$ are identical or different and are hydrogen, $C_1$–$C_6$-alkyl, phenyl or halogen, for example chlorine or bromine, characterized in that polycarbonates of the formula (II)

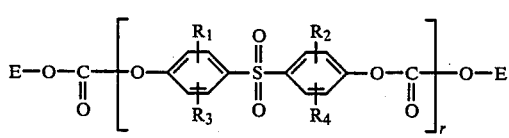

wherein $R_1$ to $R_4$ have the meaning mentioned for formula (I), r is an integer from 5 to 200 and E—O— is a monophenate radical, are heated, in the presence of basic or neutral catalysts in amounts of 0.00001 to 5% by weight, preferably 0.001 to 0.1% by weight, relative to the weight of polycarbonate (II), at temperatures of 250° C. to 450° C., preferably 300° C. to 400° C., under pressures of 0.01 bar to 1 bar, preferably 0.1 bar to 1 bar, for between 10 minutes and 10 hours, preferably between 10 minutes and 60 minutes.

Preferred values for r are 100 to 150.

Preferred aromatic radicals E are phenyl and/or cresyl.

Preferred radicals $R_1$ to $R_4$ are H or methyl.

Examples of basic catalysts are the alkali metal salts of weakly acid compounds, such as the dipotassium or disodium salt of bisphenol A, the potassium or sodium salt of cumylphenol or potassium acetate.

Examples of neutral transesterification catalysts are butyl titanate or antimony trioxide.

The catalysts can be added separately or can be introduced via the preparation of the polycarbonates (II).

The polycarbonates of the formula (II) are known compounds (see, for example, U.S. Pat. No. 3,271,367 (Ue 1695) and DE-AS (German Published Specification) No. 1,007,996 (Ue 1695)); they can, for example, be prepared from the sulphone-diphenols (III)

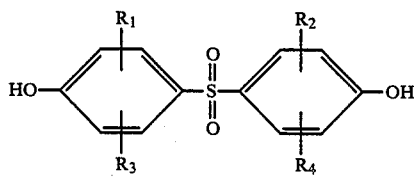

by means of diphenol carbonate by the known (see, for example, U.S. Pat. No. 3,271,367, Example 1) polycarbonate transesterification process. In this case, when the phenol cleavage is complete, an immediate transition into the polyether preparation can be made (see Example 2 of the present application).

The preparation of the low-molecular starting materials of the formula (II) in which r=1 to 3 is effected by reacting, in a known manner, the dihydroxydiphenyl sulphone with phenyl chloroformate or by phosgenating a mixture of the dihydroxy compound and the monophenol in the corresponding molar ratio of dihydroxy compound to monophenol, such as 1:2, 2:2 or 3:2, respectively.

In a preferred embodiment, the preparation of the polycarbonates (II) can be carried out, in accordance with the teaching of British Patent Specification 808,489 (Ue 1733), by the melt transesterification process, for example from dicarbonates (IIa)

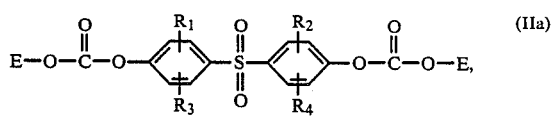

wherein E is, for example, phenyl and $R_1$ to $R_4$ have the meaning mentioned for formula I, that is to say are heated at 170° C. to 200° C. with basic transesterification catalysts, such as Na benzoate, and, after the diphenyl carbonate has been removed, the polyether preparation according to the invention can then follow immediately. (See Example 3 of the present invention).

The preparation, according to the invention, of the polyether-sulphones can, for example, be carried out in a kneader or a screw extruder. The reaction rate can be monitored via the elimination of $CO_2$, and the temperature control can be matched with this.

The polyether-sulphones prepared in accordance with the invention can be extruded immediately, via the melt, to give granules.

Polyether-sulphones are known (see, for example, Kunststoffe 69 (1979), pages 3 to 5, Kirk-Othmer, Encyclopedia of Chemical Technology, 3rd edition, volume 18, pages 832 to 848 and Kirk-Othmer, loc. cit., pages 605 to 610).

The preparation of the polyether-sulphones of the formula (I) has hitherto been carried out either by a Friedel-Crafts condensation reaction of arylsulphonyl halides with an aromatic compound in accordance with equation A

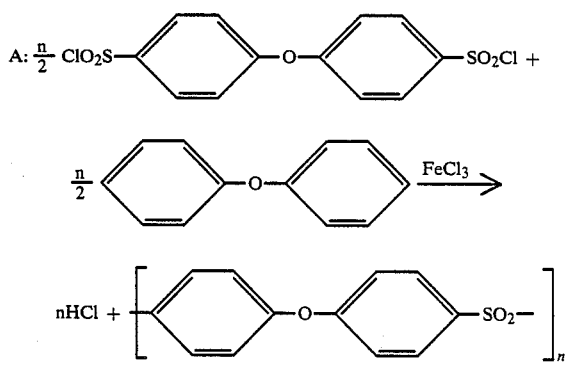

Another preparation is carried out by polyether formation from dihalides and, if appropriate, diphenols in accordance with equations B and C:

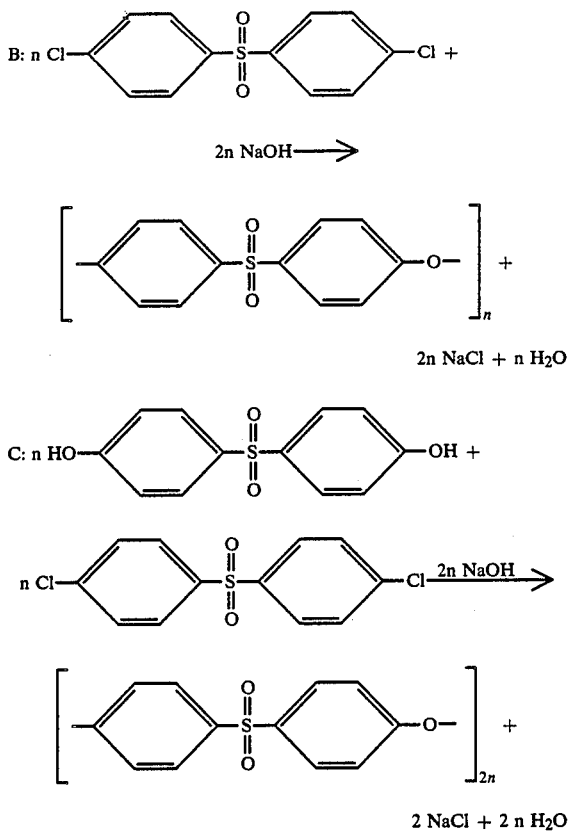

A third mode of preparation is effected by subjecting an alkali metal salt of a halogenophenol to a condensation reaction with elimination of alkali metal halide in accordance with equation D:

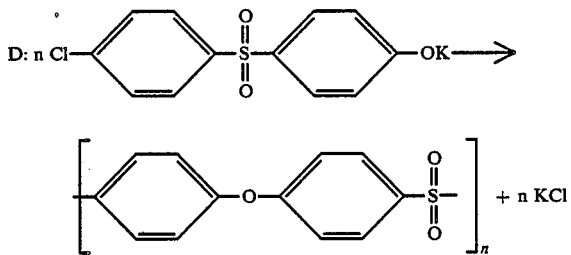

In our opinion, however, the process of the present invention is neither described nor suggested in the state of the art.

It is also possible to add stabilizers which are customary for polyether-sulphones, lubricants, such as chlorinated bisphenyls, dyestuffs, pigments, fillers, glass fibres or glass spheres in the customary amounts during the process according to the invention or after it has been carried out.

The polyether-sulphones obtained by the process according to the invention have average number average molecular weights $\overline{M}n$ between about 1,000 and 50,000.

The polyether-sulphones obtained have a good dimensional stability under heat and a good resistance to solvents. Depending on their molecular weight, they can be processed to give various shaped articles, such as fibres, films, panels, foams or coatings, which are used in the electrical industry.

Low-molecular polyether-sulphones ($\overline{M}n$ up to a maximum of 5,000) can also be used as fire-retarding agents for thermoplastics.

EXAMPLE 1

A polycarbonate obtained from 4,4-dihydroxydiphenyl sulphone having $\overline{M}w$ (weight average molecular weight, determined by means of light scattering) of 20,000, prepared by transesterification of the bisphenyl carbonate of 4,4'-dihydroxydiphenylsulphone (see Example 3) is raised to a temperature of 250°-280° C. in a kneader. Carbon dioxide is eliminated. According to elementary analysis and IR spectrum, the product is a polyether-sulphone. Melt viscosity at 380° C.: 120 Pas, corresponding to an $\overline{M}n$ of about 25,000.

EXAMPLE 2

100 g of 4,4'-dihydroxydiphenyl sulphone are mixed with 87.8 g of diphenyl carbonate and 0.13 g of the dipotassium salt of 4,4'-dihydroxydiphenyl sulphone, and are melted, with elimination of phenol. Carbon dioxide is eliminated at a temperature of 250°-280° C. A polymer having a melting point of 225° C. is obtained after 120 minutes. According to elementary analysis and IR spectrum, the product is a polyether-sulphone. Melt viscosity at 380° C.: 80 Pas.

EXAMPLE 3

49 g of bis-(oxyphenyl)-sulphone di-(phenyl)carbonate, which has been prepared in a known manner from 1 mole of 4,4'-dihydroxydiphenyl sulphone and 2 moles of phenyl chloroformate, are mixed with 0.03 g of the dipotassium salt of bisphenol A, and the mixture is melted. Elimination of diphenyl carbonate sets in at approximately 170° C. When the elimination of diphenyl carbonate slackens, the temperature is raised slowly to 300° C. The vacuum falls off from 0.2 mbar to 4 mbar.

Heating is continued until the elimination of $CO_2$ is concluded. This gives a polymer which, according to elementary analysis, is a polysulphone. There is no longer any carbonyl band in the IR spectrum. Yield: 95% of theory. The polymer can be processed to give shaped articles having a long-term heat resistance of approximately 180° C. Melt viscosity at 380° C.: 100 Pas.

We claim:

1. A process for the production of a polyethersulphone of the general formula

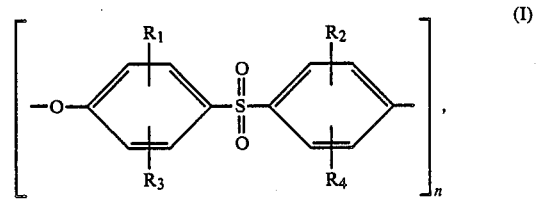

wherein
n is an integer from 5 to 200, and
$R_1$, $R_2$, $R_3$ and $R_4$ are identical or different and denote hydrogen, $C_1$–$C_6$-alkyl, phenyl or halogen,
in which a polycarbonate of the general formula

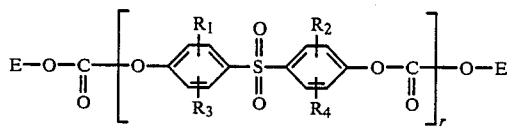

wherein
$R_1$ to $R_4$ have the meanings given above,
r is an integer from 5 to 200 and
E—O— is a monophenate radical, is heated, in the presence of a basic catalyst in an amount of 0.00001 to 5% by weight, relative to the weight of polycarbonate (II), at a temperature of 300° C. to 400° C., under a pressure of 0.01 bar to 1 bar, for between 10 minutes and 10 hours.

2. A process according to claim 1, in which the heating is carried out for between 10 minutes and 60 minutes.

3. A process according to claim 1, in which the heating is carried out under pressure of 0.1 bar to 1.0 bar.

4. A process according to claim 1, in which the basic catalyst is employed in an amount of 0.001 to 1% by weight.

5. A process according to claim 1, in which r is an integer from 100 to 150.

6. A process according to claim 1, in which E represents a phenyl and/or cresyl group.

7. A process according to claim 1, in which radicals $R_1$ and $R_4$ are, independently, hydrogen or methyl.

8. A process according to claim 1, in which the basic catalyst is selected from the dipotassium or disodium salt of bisphenol A, the potassium or sodium salt of cumylphenol or potassium acetate, butyl titanate and antimony trioxide.

9. A process according to claim 1, in which the polycarbonate (II) is prepared in situ by the transesterification processes, and, when the elimination of phenol is complete, the preparation of the polyether is begun.

10. A process according to claim 1, in which a dicarbonate of the formula

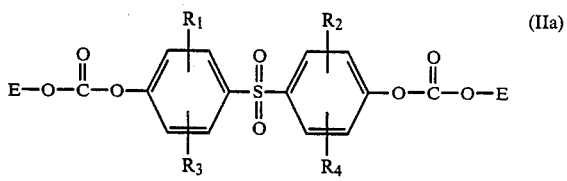

wherein
E denotes phenyl and
$R_1$ to $R_4$ have the same meanings as in claim 1 is heated with a basic transesterification catalyst at 170° C. to 200° C., and, the diphenyl carbonate is removed, to give the polycarbonate of formula (II), prior to its reaction to give the polyethersulphone of formula (I).

* * * * *